United States Patent [19]

Steidl

[11] 4,275,942
[45] Jun. 30, 1981

[54] STOWAGE BIN MECHANISM

[75] Inventor: Robert H. Steidl, Everett, Wash.

[73] Assignee: The Boeing Company, Seattle, Wash.

[21] Appl. No.: 973,424

[22] Filed: Dec. 26, 1978

[51] Int. Cl.³ .................. A47B 49/00; B65D 43/24
[52] U.S. Cl. .................................. 312/266; 312/269;
    312/247; 220/335; 217/60 E; 16/66
[58] Field of Search .............. 312/266, 269, 272, 247;
    105/317, 321, 325; 211/131; 108/26; 403/113;
    217/60 E, 60 F; 5/10 R; 220/335

[56] References Cited
U.S. PATENT DOCUMENTS

| | | | |
|---|---|---|---|
| 285,890 | 10/1883 | Hale | 105/321 |
| 428,258 | 5/1890 | Waite | 105/315 |
| 829,385 | 8/1906 | Brennan, Jr. | 217/60 E |
| 876,159 | 1/1908 | Erickson | 312/266 |
| 1,100,329 | 6/1914 | Sellers | 312/266 |
| 1,145,264 | 7/1915 | Pflug | 312/266 |
| 1,430,960 | 10/1922 | Elwert | 312/266 |
| 1,625,480 | 4/1927 | Ludy | 312/266 |
| 1,964,339 | 6/1934 | Brassell | 312/247 |
| 2,161,323 | 6/1939 | Stephenson | 312/266 |
| 2,556,140 | 6/1951 | Lyon | 105/315 |
| 2,635,030 | 4/1953 | Stebbins et al. | 312/266 |
| 2,650,370 | 9/1953 | Cudini | 5/9 |
| 2,676,333 | 4/1954 | Patton et al. | 5/9 |
| 2,940,111 | 6/1960 | Patriquin | 16/66 |
| 3,138,275 | 6/1964 | Dempster et al. | 220/335 |
| 3,183,550 | 5/1965 | Phelps | 217/60 E |
| 3,195,969 | 7/1965 | Wallen | 312/269 |
| 3,289,242 | 12/1966 | Mallory | 16/66 |
| 3,406,999 | 10/1968 | Kozicki | 312/266 |
| 3,909,857 | 10/1975 | Herrera | 5/10 R |
| 4,026,434 | 5/1977 | Howard | 220/18 |
| 4,076,351 | 2/1978 | Wyant | 312/247 |

Primary Examiner—Victor N. Sakran
Attorney, Agent, or Firm—Ronald E. Suter; Bernard A. Donahue

[57] ABSTRACT

The invention is an overhead stowage bin mechanism particularly adapted for use in passenger airplanes. In the preferred embodiment, each end of the bin is supported by a pair of pivoted arms of unequal length so proportioned that the bin moves from its stowed position downward and slightly forward, at the same time tilting slightly for ease of access. The arms interengage in the down position to increase rigidity. A spring cartridge is connected to each of the upper arms to counterbalance the weight of the bin, and also is arranged to hold the bin in the down position. The upper arms are interconnected by a torque tube, and a snubbing device is also included in the mechanism.

21 Claims, 4 Drawing Figures

U.S. Patent   Jun. 30, 1981   Sheet 1 of 2   4,275,942
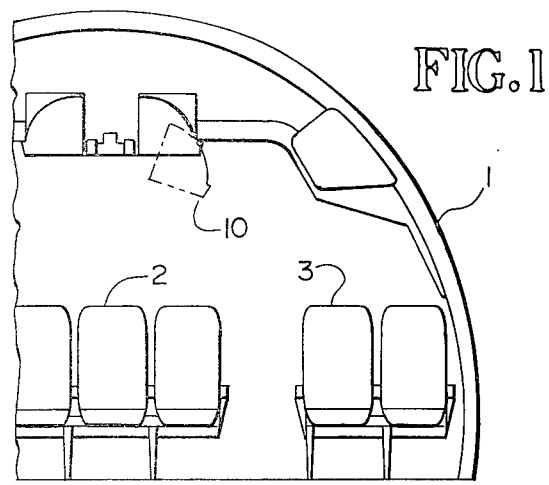
FIG. 1
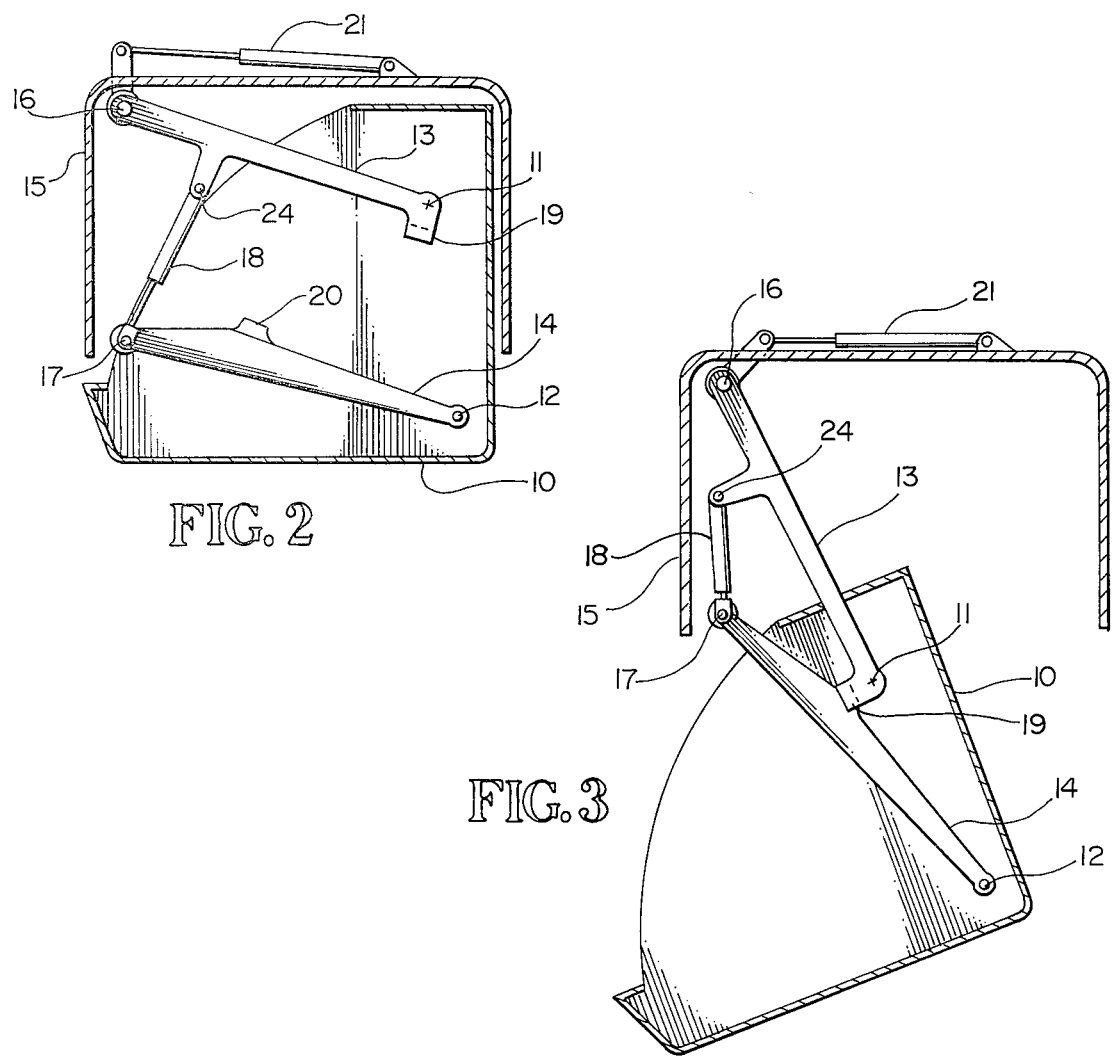
FIG. 2
FIG. 3

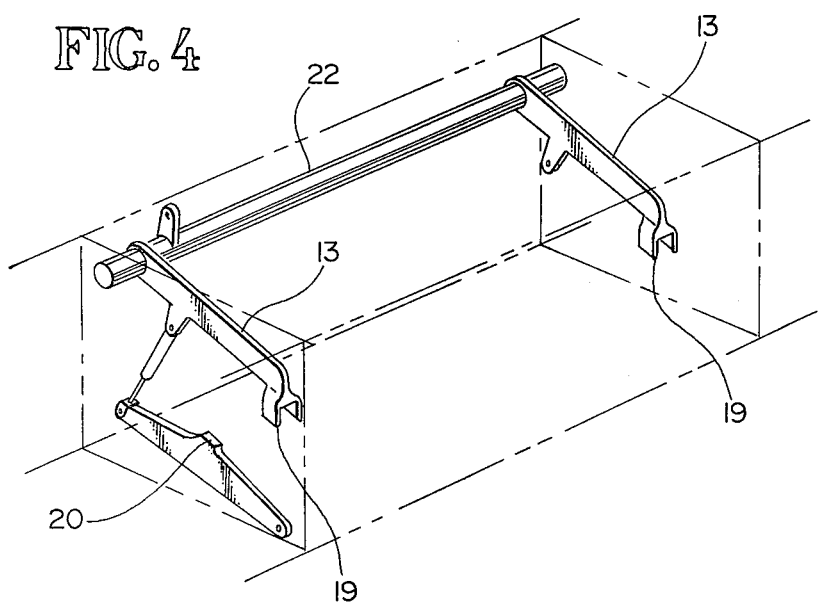

STOWAGE BIN MECHANISM

FIELD OF THE INVENTION

This invention relates to overhead stowage bin mechanisms, and more particularly to such mechanisms for use in modern commercial passenger airplanes.

BACKGROUND OF THE INVENTION

Common carrier vehicles have long been provided with some sort of stowage for passenger's personal luggage adjacent the passenger seats. The stowage in earlier forms consisted of a simple rack along the sides of the vehicle, as a railway car, while in later years, especially in aircraft, such stowage has been elaborated to one sort or other of closable bins. Such are not only more sightly and convenient, but also restrain the contents from being ejected onto the heads of the passengers in the event of rough air. Such bins have been in some cases stationary with doors, while in other configurations have been pivoted so that they may tilt downward for easier access.

Racks or bins along the outer wall of an airplane may be relatively low (with respect to the floor) without seriously impeding access to the seats. However, the advent of multi-aisle seating arrangements, in which three or four seats may be between the aisles, close to the centerline of the airplane body, imposes a requirement that the stowage bins be somewhat higher from the floor in order to make access to the center seats easy. On the other hand, the bins must be capable of being easily lowered to easy reach of passengers and attendants.

DESCRIPTION OF THE DRAWINGS

FIG. 1 of the drawings is a diagrammatic transverse section of an airplane fuselage, showing a typical arrangement of seats and stowage bins.

FIG. 2 is a transverse section showing a stowage bin and the supporting mechanism in its retracted or stowed position.

FIG. 3 is a similar section showing the bin and associated mechanism in the extended or down position.

FIG. 4 is a perspective of the mechanism.

DESCRIPTION OF THE PREFERRED EMBODIMENT

Modern large passenger airplanes (so-called "widebody" craft) ordinarily have the seats arranged in three groups, separated by two longitudinal aisles. Customarily, also, various types of overhead stowage bins or racks are provided to accommodate coats and small luggage of the passengers. In the configuration shown in FIG. 1, for example, each transverse row of seven seats consists of two seats 3 along each outer wall of the fuselage and three center seats 2, leaving two aisles. Above the center seats are sets of luggage bins 10 to serve the passenger occupying these center seats. It is apparent that such bins should, in their retracted or stowed position be sufficiently above the floor to provide adequate headroom for easy access to the seat. However, such bins in their extended or down position should be sufficiently low to permit easy access, while at the same time should not obstruct the aisles. Also, in common with all aircraft equipment, the mechanism supporting the bins should be strong, light, simple, and reliable. This invention is particularly directed to meeting the requirements of center stowage bins, although it is not limited in its application to this special problem.

FIG. 2 illustrates such a center stowage bin and the mechanism devised for supporting and guiding it. The supporting fixed structure 15 consists of a longitudinal inverted channel-shaped element provided with spaced transverse bulkheads (not shown). Fitting within this supporting structure is the bin 10 itself, of generally C-shaped cross section. The bin is supported and guided by two sets of arms or linkages, 13 and 14. The upper arm 13 is pivoted at 16 on the fixed structure 15, while its outer end is pivoted to the end wall of the bin at 11. The lower arm 14 is of slightly greater length, and is pivoted on the fixed structure at 17 (for example to the traverse bulkheads (not shown)) and to the bin at point 12. As illustrated, the fixed points 16 and 17 are vertically spaced on the aisle side or "front" of the structure, while the movable points 11 and 12 are closer to the centerline of the airplane, or the "back" of the bin. Thus the structure between points 17 and 16, the arm 13 between 16 and 11, the bin between 11 and 12, and the arm 14 between 12 and 17 in effect constitute a four-bar linkage, the links as shown being of unequal length.

It will be understood by persons skilled in the mechanical arts that changing the lengths of these links will provide a variety of positions and attitudes for the bin as it travels outwardly from its retracted position. The lengths of these links and location of their pivot points may be chosen so that as the bin moves to its extended or down position, as shown in FIG. 3, the bin moves principally downward, slightly forward (toward the aisle), and tilts slightly, so that its forward or aisle side is lower than the back. In the extended or down position, the bin thus is within easy reach, but does not obstruct the aisle between the seats.

The mechanism exhibits several refinements enhancing the basic linkage thus far described. First, to counterbalance the weight of the bin and its contents a spring cartridge or biasing means, 18, which preferably is a gas spring (a piston-cylinder assembly containing gas under pressure), is installed between the fixed point 17 and a pivot 24 on a lateral extension of upper arm 13, thus resisting downward motion of the arm 13 and the bin 10. The spring cartridge 18 provides a counterclockwise moment about pivot point 16, as shown in FIG. 2. As the bin is lowered the spring is compressed and its force increases; however, the effective moment arm of the force about point 16 decreases so that the counterbalancing moment is fairly constant until the bin is almost fully lowered. When the bin is almost fully lowered, the spring goes "over-center", as shown in FIG. 3. That is, point 24 is to the left (as shown) of a line joining points 16 and 17, with the result that the spring holds the bin in its down position. A snubbing device 21 is utilized to control the drop rate, particularly when the bin is heavily loaded. The snubbing device is preferably "dry", i.e., operates on frictional principles without use of a fluid.

The down position for the bin 10 is conveniently established by interengagement means comprising a boss or abutment 20 on the lower arm 14, and an inner surface of a fork-shaped abutment means 19 located on upper arm 13. In addition to limiting further downward travel of the bin, these interengagement means provide rigidity and stabilize the mechanism in the lateral direction (fore-and-aft with respect to the airplane). This is accomplished by the outwardly extending flanges of abutment means 19, which are best shown in FIG. 4.

The outwardly extending flanges may be appropriately radiused and lined with a low friction material for ease of seating upon and around the abutment 20 when the bin 10 is in its extended position. The insides of the outwardly extending flanges are then located in snug engagement with the sides of abutment 20 and the lower arm 14. This provides a rigidity and stability against movement of the bin 10 in the lateral direction when it is fully extended.

As best shown in FIG. 4, the two upper arms 13, and the flange to which snubbing device 21 attaches, are each rigidly affixed to a torque tube 22. The torque tube 22 is preferably quite rigid under torsional loads, so as to force the two arms to work together. Moreover, it should be stiff enough to stabilize the entire mechanism against racking of the bin caused by uneven loading or operation, and to reduce, or eliminate, the need for the bin itself to be torsionally stiff, thereby reducing the structural weight of the bin. For example, the torque tube 22 may be constructed of a relatively lightweight material having a high modulus of elasticity, such as a graphite filament wound tube.

It should be apparent from the foregoing description that the mechanism of this invention provides a stowage bin system which is light in weight as well as being convenient and safe to use. The spring cartridge 18, the snubbing device 21, the lengths and pivot positions of the four-bar linkage, and the interengagement means, may be individually and collectively designed to achieve a wide variety of desired results. The bin should be provided with a positive latching device to retain it in its stowed position. Such a latching device (not shown) may be of a well-known type, such as a spring biased overcenter pawl with a guidance ramp. After the latch is released, the bin should move downwardly slowly and steadily even if it is very heavily loaded. When the load is removed from the bin, and it is moved upward slightly to cross through the overcenter position of the mechanism, the bin should slowly and steadily return to its stowed position under the moment created by the spring cartridge 18. In the preferred embodiment shown, the mechanism is entirely "dry", that is, neither the spring cartridge 18 nor the snubber device 21 utilize hydraulic fluids; thereby preventing any possibility of damage to bin contents caused by leakage of such fluids. The torque tube 22 is, of course, rotably mounted on the fixed supporting structure 15, preferably by low-friction bearings. Such bearings may also be used at each of the pivot points for the four-bar linkage mechanism.

Variations and modifications to the preferred embodiment shown will readily occur to persons skilled in the art, without departing from the spirit and scope of the invention. Accordingly, it is intended in the appended claims to cover all such variations and modifications.

I claim:

1. A stowage bin assembly comprising a supporting structure, a bin movable with respect to the supporting structure, and mechanism carrying said bin for said structure comprising a first pair of arms pivoted on said structure and on said bin, a second pair of arms vertically spaced from said first pair, pivoted on said structure and said bin, each of said second pair of arms being provided intermediate its length with an abutment, and each of said first pair of arms having a fork adjacent its movable end adapted to engage said abutment in one relative position of said arms.

2. A storage bin assembly as described in claim 1 having spring means acting between the fixed structure and said first arms resisting motion thereof.

3. A storage bin assembly as described in claim 2 wherein the spring means is attached to said first arms at a point displaced from a line joining the pivots thereof whereby the torque exerted by the spring means on said arms reverses direction in a limiting relative position of said arms.

4. A stowage bin assembly as described in claim 1 wherein the first pair of arms are joined by a torque resisting element.

5. In a stowage bin assembly comprising a fixed supporting structure and a relatively movable bin: mechanism for supporting and guiding said bin from and with respect to said structure comprising, an upper arm pivoted at its extremities to said structure and said bin, a lower arm also pivoted at its extremities to said structure and said bin, said lower arm having an abutment intermediate its extremities, and said upper arm having a cooperating abutment-engaging element engageable with said abutment and interfitting therewith, and limiting relative motion of said arms about their pivots and resisting relative motion therebetween parallel to said pivots.

6. A stowage bin assembly comprising supporting structure, a torque tube rotatably mounted on said supporting structure, a bin movable with respect to said supporting structure between stowed and open positions, control means connected between said bin and said torque tube for controlling movement of said bin as it travels form its stowed to its open position, means acting on said control means for creating a moment which opposes movement of said bin away from either its stowed or open position, and snubbing means acting on said control means for limiting rapid motion of said bin in either direction of its travel.

7. The assembly of claim 6 wherein said control means comprises a four-bar linkage mechanism.

8. The assembly of claim 7 wherein said control means comprises interengagement means for limiting further downward travel of the bin and for reacting lateral loads from the bin thereby providing rigidity and stability in a lateral direction.

9. The assembly of claim 8 wherein said interengagement means comprises interengaging surfaces carried by said four-bar linkage.

10. The assembly of claim 9 wherein said four-bar linkage mechanism comprises two spaced apart arms each of which carry one of said interengaging surfaces.

11. The assembly of claim 10 wherein one of said arms comprises an abutment surface and the other arm comprises a fork-shaped abutment means, wherein said fork-shaped abutment means includes an abutment surface and a pair of flanges outstanding therefrom, the inside surfaces of which are designed to fit in snug engagement with the sides of said abutment surface on said one of said arms.

12. The assembly of claim 6 wherein said control means comprises a first arm rigidly affixed to said torque tube, a second arm spaced apart from said first arm, and said means for creating a moment includes a spring means attached to said first and second arms.

13. A stowage bin assembly comprising a supporting structure, a bin movable with respect to said supporting structure between stowed and open positions, and means for movably supporting said bin, said means comprising a first linkage means having one end pivotally secured at a first location on said structure and the other end pivotally secured at a first location on said bin, a second linkage means having one end pivotally secured at a second location on said structure and the other end pivotally secured at a second location on said bin and biasing means, connected between said structure and a point on said first linkage means displaced from a straight line joining the two ends thereof, for producing a moment about said first location on said structure which acts in a first direction until said point passes a line joining said first locations and then acts in a different, second direction whereby in moving to its stowed from its open position, said bin moves principally downward, slightly forward and tilts slightly so that one side thereof is lower than the other side to provide easy access.

14. A stowage bin assembly as defined in claim 13 wherein said biasing means is connected to said structure at said second location on said structure whereby when said point passes said line joining said first locations the moment produced by said biasing means tends to pivot said first linkage means toward said second said linkage means.

15. A stowage bin assembly as defined in claim 14 wherein the distance between said first and second locations on said bin is fixed.

16. A stowage bin assembly as defined in claim 15 wherein the distance between said first and second locations on said structure is fixed.

17. A stowage bin assembly as defined in claim 16 wherein said first and second linkage means include interengagement means for limiting travel of said bin and for stabilizing said bin in the lateral direction thereof.

18. A stowage bin assembly as defined in claim 17 further comprising snubbing means connected to one of said linkage means for limiting rapid movement of said bin as it moves toward either its stowed or its open position.

19. A stowage bin assembly as claimed in claim 18 further comprising a torque tube having two ends, each of which is rotatably mounted to said structure, said tube being rigidly connected to said first linkage means for equalizing loads form one end of said bin to the other.

20. A stowage bin assembly as claimed in claim 19 wherein said snubbing means is attached to said torque tube.

21. A stowage bin assembly as claimed in claim 20 wherein said snubbing means is attached to said torque tube at a point displaced from a straight line joining the two ends thereof.

* * * * *